United States Patent [19]

Charkoudian

[11] 4,006,036
[45] Feb. 1, 1977

[54] METHOD FOR REDUCING ZINC OXIDE CONTENT OF ZINC PARTICLES

[75] Inventor: John C. Charkoudian, Cambridge, Mass.

[73] Assignee: Polaroid Corporation, Cambridge, Mass.

[22] Filed: Dec. 26, 1974

[21] Appl. No.: 536,433

[52] U.S. Cl. .............................. 427/123; 429/229
[51] Int. Cl.² .......................................... H01M 4/38
[58] Field of Search ................. 136/31, 30, 126; 423/109; 75/101 BE, .5, 120; 134/25 R, 26, 28

[56] References Cited

UNITED STATES PATENTS

| | | | |
|---|---|---|---|
| 1,321,947 | 11/1919 | Sperry | 136/31 |
| 3,154,500 | 10/1964 | Jansen, Jr. et al. | 75/101 BE |
| 3,524,817 | 8/1970 | Roy et al. | 134/28 X |
| 3,533,843 | 10/1970 | Jerabek et al. | 136/30 |
| 3,630,781 | 12/1971 | Rampel | 136/31 |
| 3,634,070 | 1/1972 | Lindstrom et al. | 75/120 X |
| 3,663,297 | 5/1972 | Weller | 136/30 |

Primary Examiner—John H. Mack
Assistant Examiner—C. F. LeFevour
Attorney, Agent, or Firm—Philip G. Kiely

[57] ABSTRACT

Zinc particles to be employed in the manufacture of zinc anodes for batteries are treated to decrease the zinc oxide content.

8 Claims, No Drawings

METHOD FOR REDUCING ZINC OXIDE CONTENT OF ZINC PARTICLES

BACKGROUND OF THE IVNENTION

Thin, flat multicell batteries for use in radios, cameras and the like are well-known to the art. Such batteries are described, for example, in U.S. Pat. Nos. 3,734,780; 3,740,270; 3,770,504; 3,770,505; 3,784,410; and others. While various electrochemical systems are employed, the most common type is the Leclanche battery. The zinc employed as the anode is often in the form of zinc particles or dust held together by a suitable binder system. Zinc particles permit the use of less zinc than ordinarily would be used without the risk of embrittlement as a result of mercury amalgamation.

As a result of the manufacturing process employed in obtaining zinc particles and the large surface area exposed to air, zinc particles often contain a relatively high proportion of zinc oxide. While levels of zinc oxide of about 5% or more may not be deleterious for most uses, such an amount could be highly detrimental to battery operation and life.

The presence of an appreciable amount of zinc oxide can result in a pH in the electrolyte in the range of about 6. In this rage, insoluble zinc salts can form, decreasing the life of the battery or even causing total failure. If, however, the pH of the electrolyte remains close to the initial pH of about 4.8, the shelf-life is extended and attendant anode corrosion can be minimized.

SUMMARY OF THE INVENTION

The zinc oxide content of zinc particles can be decreased by treating the particles with an aqueous solution of a strong $Zn^{++}$ sequestering agent, preferably at a constant pH. In a particularly preferred embodiment, the thus-treated zinc is simultaneously treated with a surface passivation substance, e.g., quaternary ammonium compound, which inhibits the reformation of the oxide.

DETAILED DESCRIPTION OF THE INVENTION

The presence of an excess of zinc oxide in a zinc particle anode in a Leclanche system in combination with some other reactions raises the pH of the electrolyte to about 5.8 to 6.0. Thus, when the zinc in the anode contains about 5.0% or more zinc oxide, the following reaction occurs as the zinc oxide goes into solution:

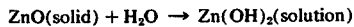

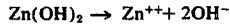

with the pH of the electrolyte going from about 4.8 to about 5.5. At the same time, other chemical reactions in the electrochemical system further drive the pH up to about 5.8.

At a pH of about 5.8 a precipitate of complex zinc salts forms resulting in crystal penetration of the separators and shorting out of the cell. An analysis of battery failures shows dried out cells and high anolyte pH.

By treating zinc dust with an aqueous solution of a strong sequestering agent for zinc ion, the percent of zinc oxide is reduced drastically. With the pH of the electrolyte below 5.0, and preferably in the range of the initial electrolyte pH, diminished insoluble salt formation is achieved, as evidenced by increased shelf-life of the batteries.

The novel process of the present invention is particularly effective when the process is carried out at a constant pH in the presence of a buffering agent. A pH of 7 is preferred. In a particularly preferred embodiment, a zinc surface passivating agent is employed, e.g., a quaternary ammonium compound. While some increase in impedance is noted with a surface passivating agent, the increase does not seriously effect battery performance.

Any suitable sequestering agent for zinc ion known to the art may be employed. a preferred sequestering agent is the disodium salt of ethylenediaminetetraacetic acid (EDTA).

The quaternary ammonium compound employed in the present invention may be water-soluble but preferably also contains a hydrophobic moiety. A preferred quaternary ammonium compound comprises benzyl-α-picolinium chloride. The quaternary ammonium compound is added to the zinc particles prior to forming the anode, either during or subsequent to the treatment with the sequestering agent. It may also be employed with conventional amalgamation techniques, i.e., in combination with mercuric chloride. However, it has been found that the amounts of mercuric chloride in excess of that conventionally employed must be used, e.g., at least two times the conventional amount.

While not intending to be bound by theory, it is believed that the following reactions occur during the process of the present invention.

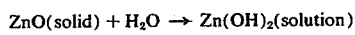

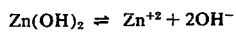

Since the formation constant of zinc ion with EDTA is in excess of $10^{16}$, the reaction strongly favors the formation of the zinc-EDTA compound.

The mixture is washed with water and the zinc formed into an anode by disposing the thus-treated zinc particles in a suitable polymeric binder material.

The following nonlimiting examples illustrate the novel process of the present invention.

EXAMPLE I

A pH 7 buffer solution was prepared by adding to 50 ml. of 0.1M potassium acid phosphate and 29.1 ml. of 0.1M sodium hydroxide. Using the thus-prepared buffer solution, a 1% solution of the disodium salt of ethylenediaminetetraacetic acid (EDTA) was prepared.

40 ml. of the EDTA solution was used for each gram of zinc particles containing about 5% zinc oxide and the mixture was stirred mechanically for 15 minutes. The particules were then allowed to settle and then filtered and washed with water.

Anodes were prepared by disposing the zinc particles in a suitable polymeric binder, coated on a conductive support and dried. The anodes were assembled in a Leclanche system and tested against a control which was identical except that the zinc particles had not been treated by the procedure of the present invention.

The cells prepared according to the procedure of the present invention showed about a 30% decrease in corrosion rate relative to the control cells even without amalgamation with mercuric chloride. The decrease in zinc oxide content was evidenced by the pH measurements of the anolyte and catholyte of the cells.

| Before pulse down | pH Control | Example I |
|---|---|---|
| Anolyte | 5.5 | 4.8 |
| Catholyte | 5.4 | 4.8 |
| After pulse down | | |
| Anolyte | 5.6 | 4.8 |
| Catholyte | 5.9 | 5.5 |

Thus, enhanced shelf-life is achieved by the cells of the present invention.

EXAMPLE II

To the flask containing 2453 cc. of 0.1M potassium acid phosphate and 1427 cc. of 0.1M sodium hydroxide add, with stirring, 40 g. of the disodium salt of EDTA and 80 cc. of a 50% solution of benzyl-$\alpha$-picolinium chloride. After all the solids are dissolved, add 100 g. of zinc particles containing about 5% zinc oxide. Stir for about 15 minutes and then filter and wash with water. The zinc particles were formed into anodes as described above.

The following data was obtained on the anodes:

| One hour after cell assembly: | OCV(volts) | Anolyte pH | Catholyte pH |
|---|---|---|---|
| Control | 1.601 | 5.6 | 5.5 |
| Example II | 1.635 | 4.9 | 4.9 |
| One day after cell assembly: | | | |
| Room temperature | | | |
| Control | | 5.6 | 5.6 |
| Example II | | 5.0 | 5.0 |
| 120° F. | | | |
| Control | | 5.6 | 5.6 |
| Example II | | 5.1 | 5.0 |

It should be noted that it is not necessary to entirely remove the zinc oxide from the zinc particles. Satisfactory battery results have been obtained with a zinc oxide content of about 2–3%.

For other components of the cells, reference may be made to the above-referenced patents.

What is claimed is:

1. The method for producing an anode assembly which comprises the steps, in sequence, of treating zinc particles with a solution of a zinc sequestering agent at a pH of about 7, washing the thus-treated zinc particles, mixing the zinc particles with a polymeric binder material, coating an electrically conductive substrate with the mixture, and drying the coating to form an adherent zinc coating on said substrate.

2. The method as defined in claim 1 which further includes the step of contacting said treated zinc particles with a surface passivating agent.

3. The method as defined in claim 1 wherein said sequestering agent is the disodium salt of ethylene diamine tetraacetic acid.

4. The method as defined in claim 1 wherein said zinc particles have a zinc oxide content prior to treatment is at least 3%.

5. The method as defined in claim 1 wherein the zinc oxide content subsequent to treatment is less than 3%.

6. The method as defined in claim 2 wherein said passivating agent is a quaternary ammonium compound.

7. The method as defined in claim 6 wherein said quaternary ammonium compound is benzyl-$\alpha$-picolinium chloride.

8. The method as defined in claim 4 wherein the zinc oxide content prior to treatment is at least 5%.

* * * * *